United States Patent [19]

Williams

[11] 4,427,978
[45] Jan. 24, 1984

[54] MULTIPLEXED LIQUID CRYSTAL DISPLAY HAVING A GRAY SCALE IMAGE

[75] Inventor: Marshall Williams, 3590 Turpin Way, Freemont, Calif. 94536

[73] Assignee: Marshall Williams, Fremont, Calif.

[21] Appl. No.: 297,636

[22] Filed: Aug. 31, 1981

[51] Int. Cl.³ .............................................. G09G 3/36
[52] U.S. Cl. ..................................... 340/784; 340/793; 350/333; 358/236
[58] Field of Search ................. 340/784, 793; 358/236; 350/333

[56] References Cited

U.S. PATENT DOCUMENTS

| | | | |
|---|---|---|---|
| 3,776,615 | 12/1973 | Tsukamoto et al. | 340/784 |
| 3,838,209 | 9/1974 | Tsuchiya et al. | 340/793 X |
| 4,180,813 | 12/1979 | Yoneda | 340/784 |

*Primary Examiner*—David L. Trafton
*Attorney, Agent, or Firm*—Harry E. Aine

[57] ABSTRACT

A field effect liquid crystal display is disclosed wherein an composite alternating voltage is successively produced across a matrix of pixels formed by crossed arrays of row and column electrodes of the display. The composite alternating voltage consists of a row driving alternating voltage component and a column driving alternating component voltage. The phases of the row and column alternating voltage components are relatively phased so as to produce the composite alternating voltage across the individual pixels. The column alternating voltage component includes a gray scale component having an (root mean square) RMS value variable in accordance with the gray scale of the image to be displayed on the liquid crystal display. Two systems are disclosed for deriving the composite RMS voltage having the gray scale component. In an analog system, an alternating square wave video signal is compared with a triangular wave to convert the gray scale video signal into a phase modulated square wave which is then fed to the column electrodes for summing with the row alternating voltage signals to derive a composite alternating voltage for energizing the respective pixels. In a second embodiment, the video analog signal is fed to an analog-to-digital converter and then to a serial-to-parallel shift register for deriving gray scale words fed to respective column counters to produce an output column drive signal having a phase modulated component variable in accordance with the gray scale of the image to be displayed.

1 Claim, 8 Drawing Figures

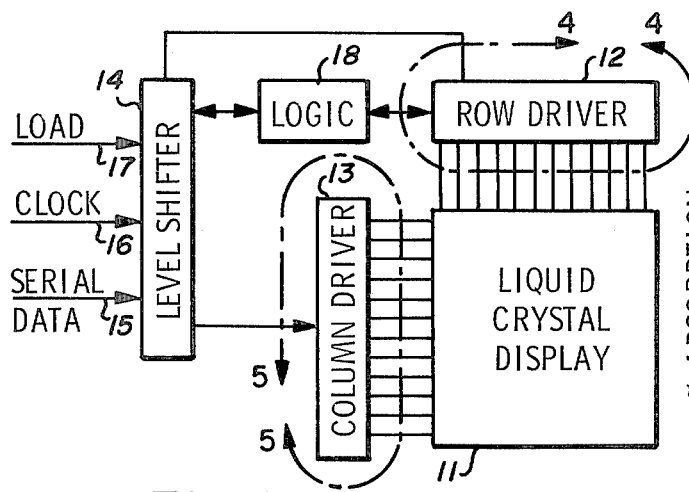
Fig_1
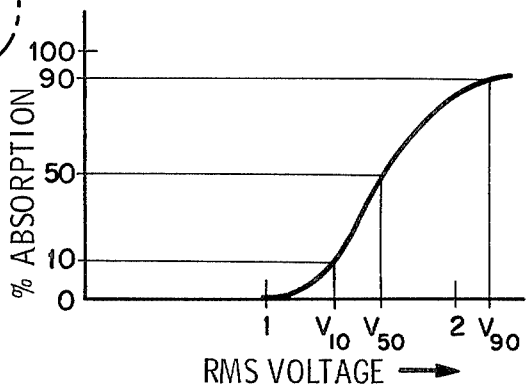
Fig_2
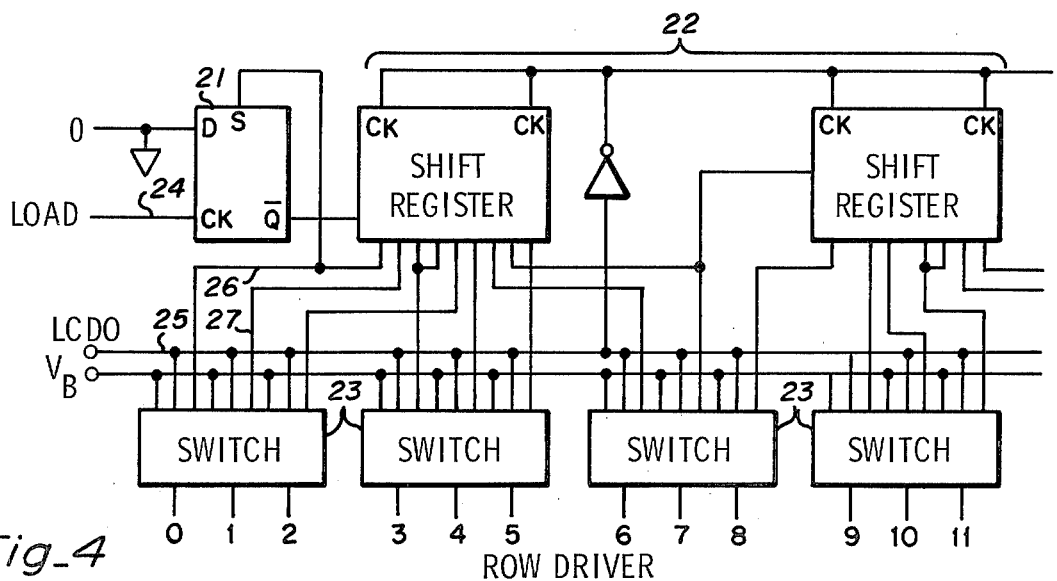
Fig_4
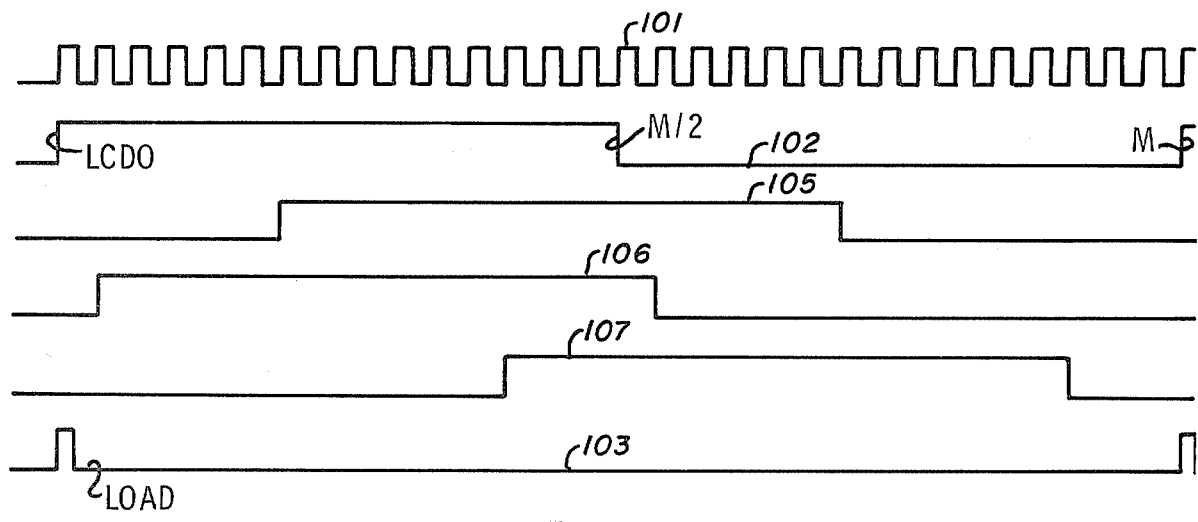
Fig_8

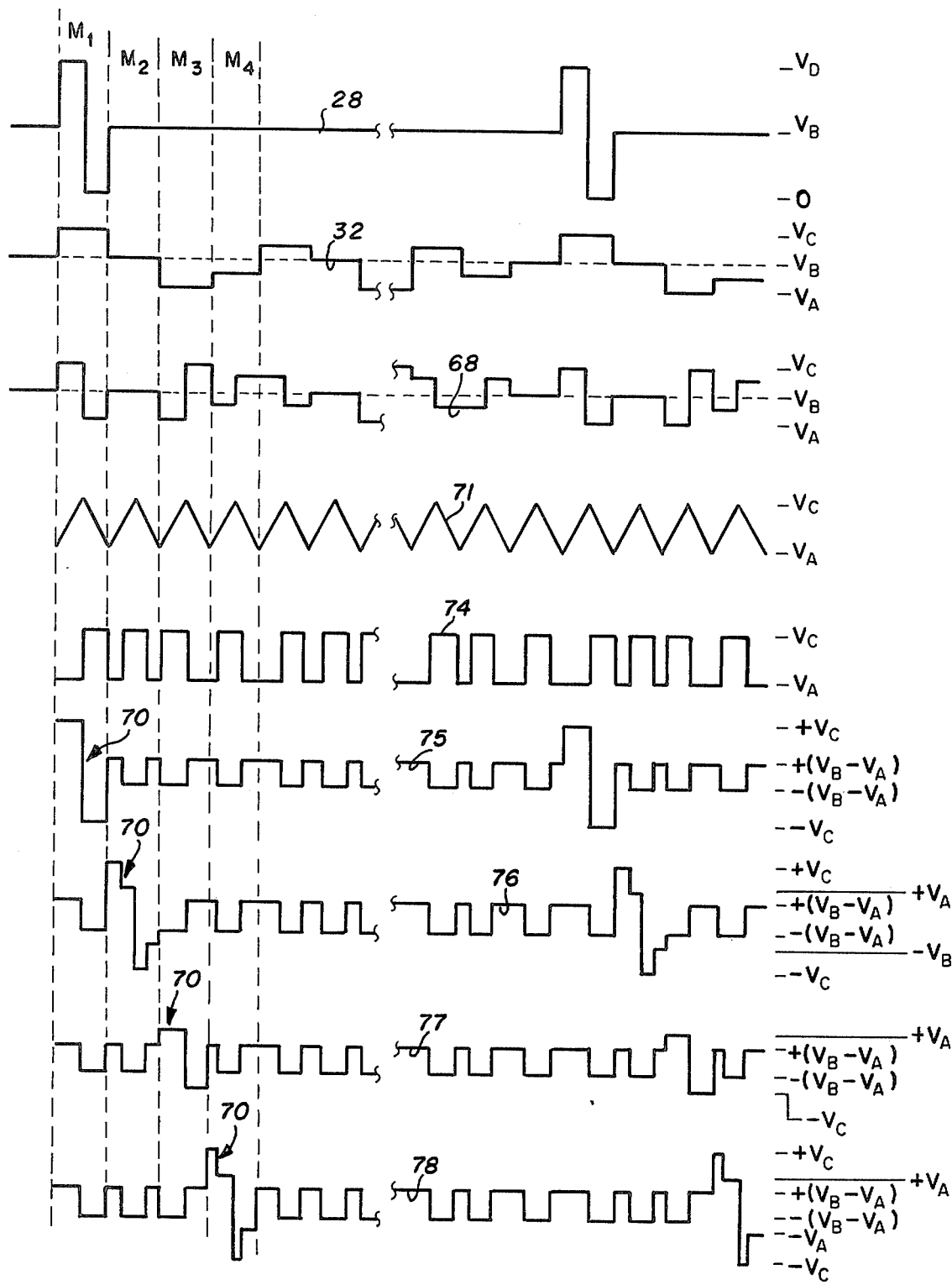
Fig_3

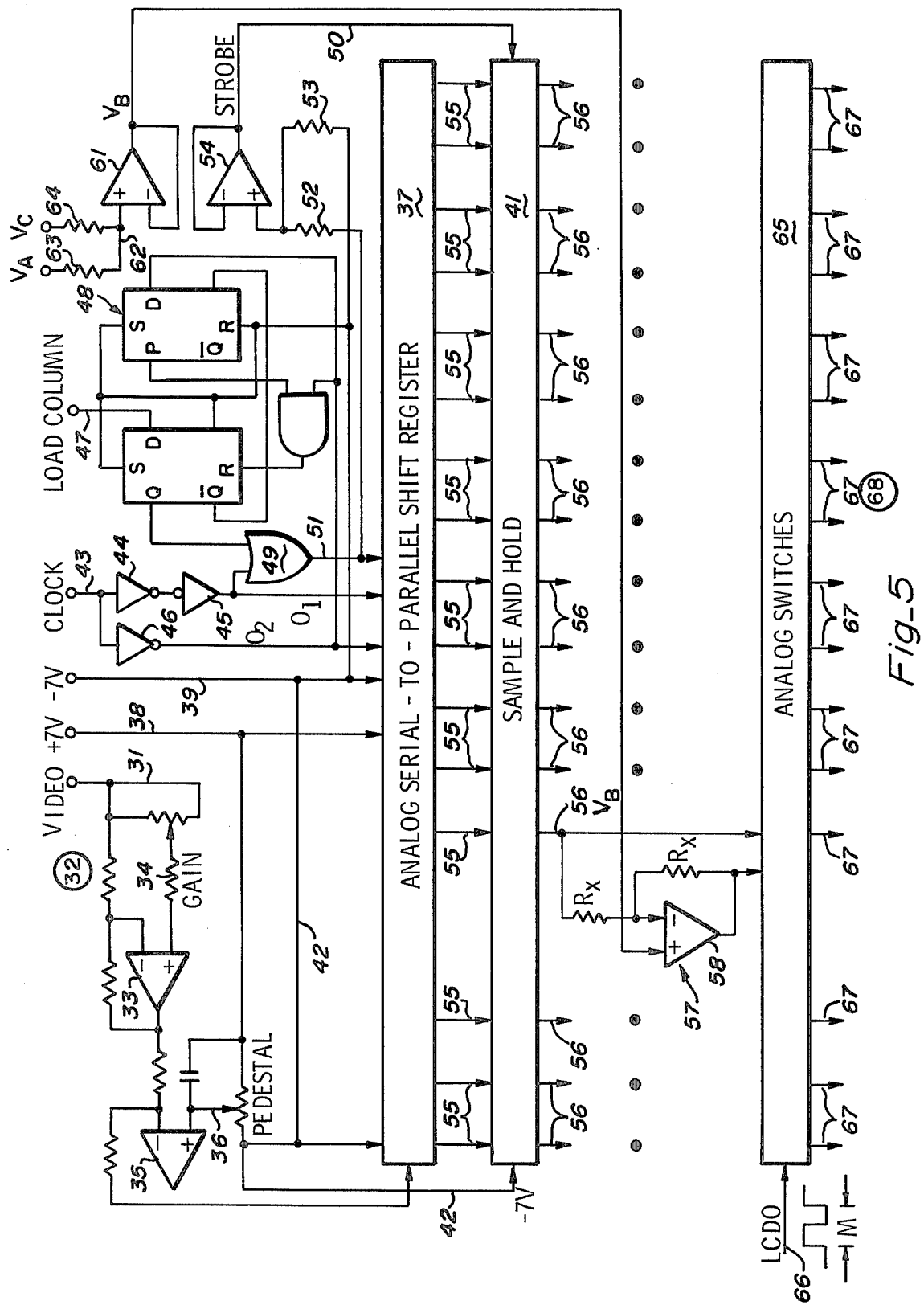

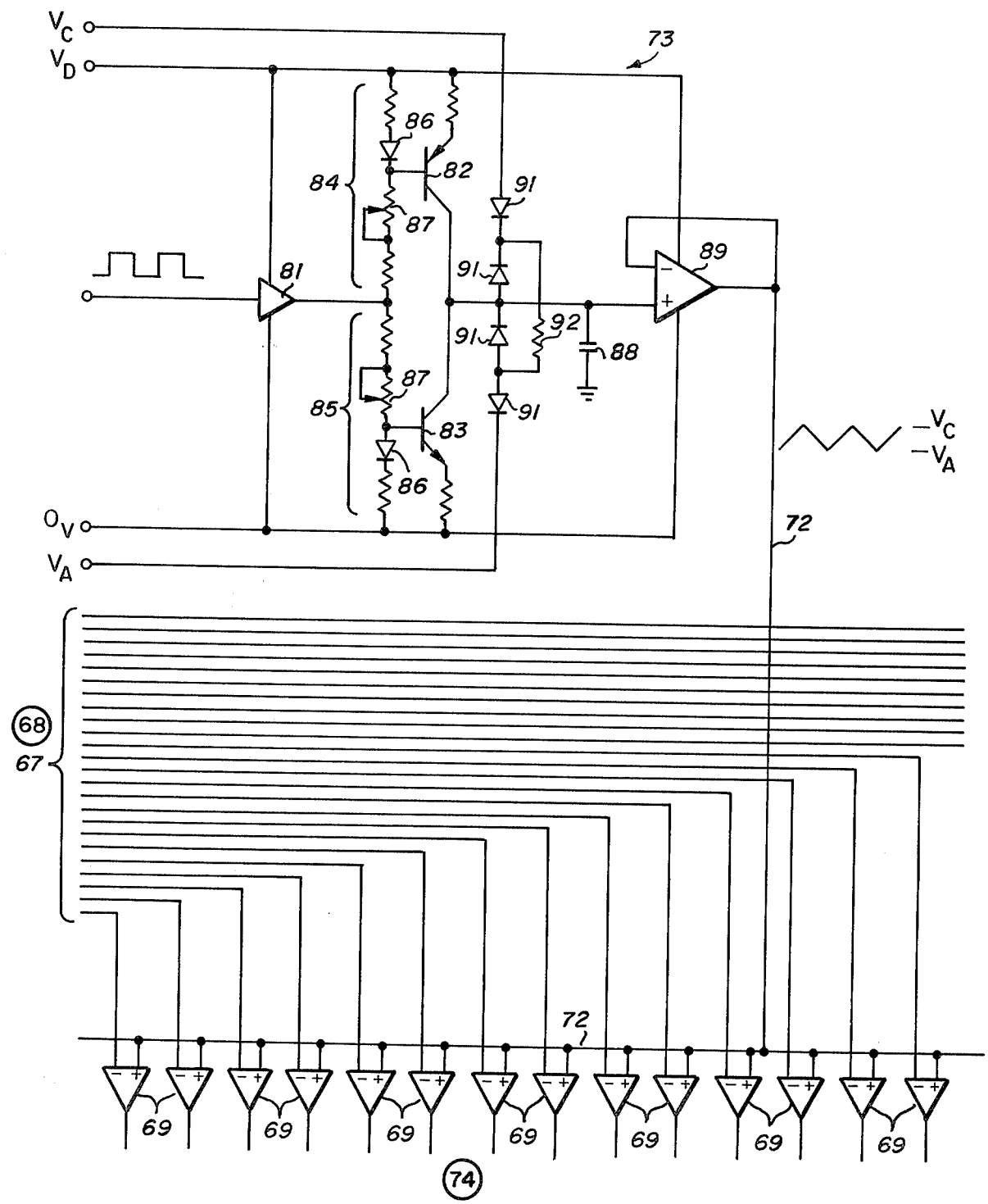
Fig_6

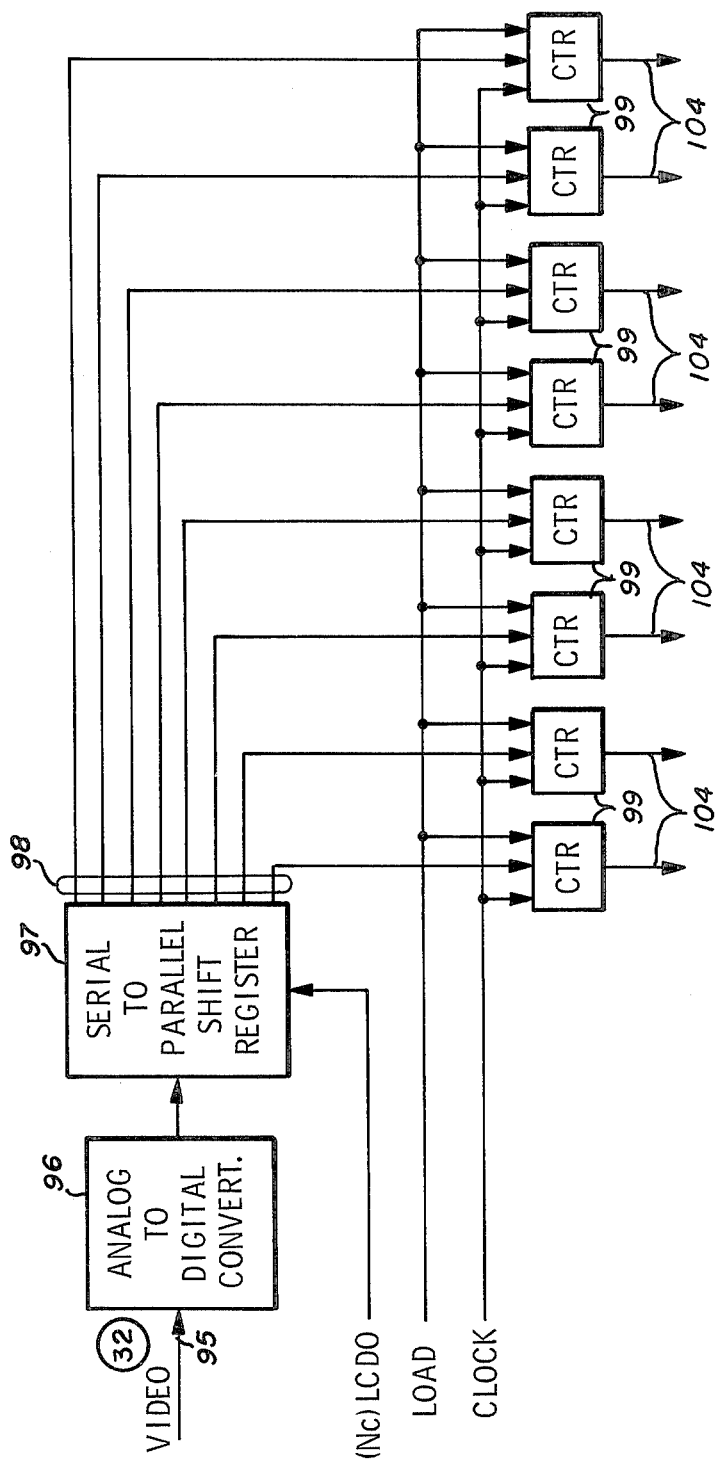
Fig_7

MULTIPLEXED LIQUID CRYSTAL DISPLAY HAVING A GRAY SCALE IMAGE

BACKGROUND OF THE INVENTION

The present invention relates in general to multiplexed liquid crystal displays and, more particularly, to an improved display having a gray scale.

DESCRIPTION OF THE PRIOR ART

Heretofore, a field effect liquid crystal display has been energized by multiplexing AC row and column voltages to crossed arrays of row and column electrodes defining the matrix of pixels of the display. In these prior art systems, the phase of the AC signal multiplexed onto the column electrodes has been varied relative to the phase of the AC voltage signals multiplexed onto the row electrodes so as to produce a composite RMS voltage across the individual pixels which has one of two values. One value corresponds to a low RMS voltage near the threshold voltage, i.e., the RMS voltage corresponding to approximately 10% absorption by the liquid crystal material, and the second or higher RMS voltage corresponds to a substantially higher absorption, i.e., 90-100%. In this manner, the individual pixels of the display are either ON or OFF providing essentially no intermediate absorption or gray scale.

Often it is desirable to provide a visual image having a gray scale as this permits substantially more information to be displayed by the liquid crystal display.

Prior multiplexed liquid crystal displays are disclosed in articles titled "Scanning Limitations of Liquid Crystal Displays," IEEE Transactions Electron Devices, Vol. ED-21, No. 2, pages 146-155 (1974) and "Ultimate Limits From Matrix Addressing of RMS-Responding Liquid-Crystal Displays," IEEE Transactions Electron Devices, Vol. ED-26, No. 5, Pages 795-802 (1979).

SUMMARY OF THE PRESENT INVENTION

The principal object of the present invention is the provision of a multiplexed field effect liquid crystal display having a gray scale image.

In one feature of the present invention, AC column drive voltages are derived having an RMS value variable in accordance with a gray scale component of the visual image to be displayed, such component being applied across successive pixels of the display matrix for deriving a visual image having a gray scale.

In another feature of the present invention, the AC column voltage includes an AC component having a phase which is modulated in accordance with the gray scale component of the visual image to be displayed.

In another feature of the present invention, the AC column voltage includes an AC component to be applied across successive pixels, such component having a duty cycle variable in accordance with the gray scale component of the visual image to be displayed.

In another feature of the present invention the phase modulated gray scale component of the composite RMS voltage signal to be applied across successive pixels is produced by comparing an amplitude modulated gray scale component of the video signal to be displayed with a triangular shaped wave for producing an alternating output signal which is phase modulated with the gray scale component.

In another feature of the present invention, the phase modulated gray scale component of the composite RMS voltage signal to be applied across successive pixels of the display is produced by deriving an amplitude modulated gray scale component and converting the amplitude of the gray scale component to a serial stream of digitally encoded gray scale words to a parallel stream of column gray scale words and counter means responsive to respective ones of the parallel column words for producing an output delayed by the amount of the respective count, thereby phase modulating the output of the counters in accordance with the gray scale component of the image to be displayed.

Other features and advantages of the present invention will become apparent upon a perusal of the following specification taken in connection with the accompanying drawings wherein:

BRIEF DESCRIPTION OF THE DRAWINGS

FIG. 1 is a schematic block diagram of a multiplexed field effect liquid crystal display of the prior art, FIG. 2 is a plot percent optical absorption vs RMS voltage for a field effect liquid crystal display, FIG. 3 is a composite drawing of a number of different waveforms utilized in the multiplexed liquid crystal display of the present invention, FIG. 4 is a schematic block diagram of a row driver portion of the structure of FIG. 1 delineated by line 4—4, FIG. 5 is a schematic block diagram of a portion of the column driver of the structure of FIG. 1 delineated by line 5—5 and incorporating features of the present invention.

FIG. 6 is a schematic diagram of a phase encoding portion of the column driver for the multiplexed liquid crystal display of the present invention, FIG. 7 is a schematic circuit diagram, in block diagram form of an alternative embodiment of that portion of the column driver circuit of the present invention which phase encodes the column drive signals with the gray scale component, and FIG. 8 is a composite drawing similar to that of FIG. 3 depicting the waveforms for the circuit of FIG. 7.

DESCRIPTION OF THE PREFERRED EMBODIMENTS

Referring now to FIG. 1 there is shown the prior art system for multiplexing a field effect liquid crystal display 11. The liquid crystal display comprises a pair of crossed linear arrays of electrodes, not shown, separated by the field effect liquid crystal material. The row array of electrodes is energized with an alternating electrical voltage in a sequential manner for scanning the rows of the liquid crystal display. The row signal is multiplexed onto the row array via a row driver 12. Similarly, the column array is simultaneously energized with alternating voltage signals, such voltage signals having a phase value in accordance with whether that particular portion of the column corresponding to the intersection with the energized row (pixel) is ON or OFF.

The column array of electrodes is driven via a column driver 13. The column driver includes a serial-to-parallel converter which converts the serial video signal for a given column into parallel bits which are held by a latch for summing with the particular row voltage derived from the energized row electrode.

A level shifter 14 receives the serial video data at 15, a clock signal at 16, and a load signal at 17. A logic circuit 18 interconnects the level shifter 14 with the row driver 12. The level shifter 14 translates the incoming signals from their supplied voltage level, typically between 3 and 18 volts, to the required operating levels within the multiplex driver. It also translates the internal levels as required, i.e., $V_D$ levels and 0 volts to $V_c$ levels and $V_A$ levels for the column driver. The logic circuit 18 provides the necessary internal clocking including internal column load and internal liquid crystal display drive, (LCD∅).

Referring now to FIG. 4 the row driver 12 is shown in greater detail. The row driver 12 includes a "D" flip-flop 21, and a shift register 22 formed by a number of cascaded shift registers such as model 4015 commercially available from National Semiconductor of Santa Clara, Calif. The outputs from the shift registers 22 are fed through a series of analog switches 23 to the row electrodes. The switches 23 are, for example, model MC14053 analog switches commercially available from Motorola.

A load command into the flip-flop 21 on lead 24 causes output terminal $\overline{Q}$ to go high. The output of the flip-flop is fed to the shift register 22. When the shift register receives an internal LCD drive clock signal (LCD∅), $Q_o$ output from the shift register on line 26 will go high which will set $\overline{Q}$ low. The high $Q_o$ line 26 will shift to $Q_1$, i.e., the next output line 27 on the next clock pulse, i.e., the next LCD∅ pulse on line 25 and will continue to proceed down the string of shift registers on successive clock pulses received on input line 25. When the signal into the analog switches from the shift register 22 is low, the analog switch output is tied to potential $V_B$. When it goes high the output is tied to the voltage of LCD∅.

Thus it is seen that the output of the analog switches 23 provides the row drive waveform, as shown at 28 of FIG. 3. More particularly, the row ON drive waveform has a period M, is a square wave and alternates between the voltages $V_D$ and O. The waveform 28 appears in row 1. Row 2 has the same waveform only displaced in phase to correspond with the period $M_2$. Accordingly, the successive rows each have a waveform as shown by waveform 28 but the AC component of the wave form appears only during its particular period $M_2$ for row 2, $M_3$ for row 3, $M_4$ for row 4, etc.

The column driver 13 (FIG. 1) in the prior art (not shown in detail) incorporated a shift register for converting the serial data corresponding to the video signal to be displayed into parallel data which was thence fed to latches and thence into column drivers which drove the respective columns. The serial data entered the shift register and proceeded from position 0 to a last position corresponding to the last column on successive clock pulses.

When the data had filled the shift register, the latches received a column load command which holds the data until the next column load. The output of the latches was fed to the column drivers. The column drivers consisted of an array of exclusive OR gates with the latch output on one input causing the clock signal LCD∅ to be inverted or noninverted at the column driver output.

The column driver circuitry is available in a single chip as HLCD 0438 commercially available from Hughes Aircraft Company of Newport Beach, Calif. While this prior art field effect liquid crystal display multiplexer can provide a video display it fails to provide any gray scale as the individual pixels are either full ON or full OFF.

Referring now to FIGS. 3, 5, and 6, there is shown a column driver circuit having a gray scale component to derive a gray scale display. More particularly, the video input signal is fed into the column driver circuit via input line 31. The video signal typically comprises an amplitude modulated signal with the amplitude variable in accordance with the gray scale of the image to be produced. Such a waveform is shown at 32 in FIG. 3. In the case of the waveform 32 it is a level shifted waveform such as that produced by a sample-and-hold device which would be sampling and holding the amplitude of an amplitude modulated video signal. The amplitude of waveform 32 corresponds to the brightness of individual pixels in a given column of the image to be displayed. In the video signal, these pixels are scanned sequentially in a given column and the sequential amplitudes of the various pixels appears as serial data and thence are converted to parallel data for driving each column electrode of the column array. The column data is thence strobed into the display by application of the row waveform 28 of the first row of the display. The next column of data is then sampled and held in a similar manner and strobed into the second row of the display by a second row signal applied during period $M_2$ to the second row of the array of electrodes.

The video signal 32 is applied to one input of a operational amplifier 33 for amplification. The gain of the amplifier 33 is controlled by means of a gain control potentiometer 34. In a typical example, the operational amplifier 33 comprises a model MC14573 commercially available from Motorola. The output of operational amplifier 33 is fed to the input of a second operational amplifier 35. A second input to the amplifier 35 is derived from a potentiometer 36 for controlling the amplitude of the pedestal portion of the video signal.

The video output signal from the operational amplifier 35 is fed to the serial data input terminal of a serial-to-parallel shift register 37. A suitable serial-to-parallel shift register 37 comprises a model R5351 commercially available from Reticon of Sunnyvale, Calif. A +7 volt potential and a −7 volt potential are supplied to the shift register 37 from a power supply, not shown, via input terminals 38 and 39. A −7 volt reference potential is also applied via lead 42 to the hold capacitors of a sample-and-hold circuit 41 connected to the output of the shift register 37.

A pair of 180° phase displaced clock signals $\emptyset_1$ and $\emptyset_2$ are derived from a clock supply via input terminal 43. Clock signal $\emptyset_1$ is derived by taking the original clock signal received on terminal 43 and feeding it serially through a pair of inverting amplifiers 44 and 45. The other clock signal $\emptyset_1$, which is 180° phase displaced relative to $\emptyset_2$ is derived by feeding the input clock signal derived at 43 through only a single inverter at 46.

A load or strobe signal is derived from an input load signal received on load input terminal 47 which is then fed through a pair of dual "D" flip-flops 48, such as model 4013 flip-flops commercially available from Motorola. The output of the dual flip-flop circuit 48 is applied to one input of an AND gate 49 for ANDing with the $\emptyset_1$ clock signal to derive a load strobe signal fed to the serial-to-parallel shift register 37 on lead 51. A sample of the load strobe signal is fed from lead 51 through a voltage divider network consisting of resistors 52 and 53 for shifting the level of the strobe signal. The output of the level shifting network is fed to one input of an operational amplifier 54 for buffering therein and the output comprises the load strobe on line 50 fed to the sample-and-hold circuit 41.

The parallel outputs 55 of the shift register 37, one for each column of the LCD, are fed to one input of the sample-and-hold circuit 41. In a typical example, the sample-and-hold circuit 41 comprises a model LF398 commercially available from National Semiconductor of Santa Clara, Calif. The serial-to-parallel shift register 37 converts the serial video data into parallel data outputted on output terminals 55, there being one output signal for each column electrode of the array. These signals are then sampled and held by the sample-and-hold circuit 41 to produce parallel outputs on lines 56.

Each sampled and held output on line 56 is converted into a pair of complementary output signals via circuits 57, there being one such circuit 57 for each of the outputs 56 of the sample-and-hold circuit 41. More particularly, the complementary output producing circuit 57 produces a pair of output voltages one above and the other below a reference voltage $V_B$ by the same identical amount. Each output 56 includes it respective circuit 57.

Circuit 57 includes a voltage divider network consisting of a series connection of a pair of resistors $R_x$ of equal resistance. The voltage divider network is connected to output line 56. A center tap of the voltage divider network is fed to the negative input terminal of an operational amplifier 58 for the comparison with the reference voltage $V_B$ fed to the positive input terminal of input operational amplifier 58.

The reference voltage $V_B$ is derived via line 59 from the output of an operational amplifier 61 having its positive input terminal connected to the voltage node 62 of a voltage divider network comprising resistor 63 and 64 of equal resistance connected across reference voltages $V_A$ and $V_C$ such that voltage $V_B$ has a value midway between potentials $V_A$ and $V_C$.

The complementary output voltages from circuit 57 are fed to the input terminals of analog switches 65. In a typical example, the analog switches comprise model MC14551 devices commercially available from Motorola. The analog switches are driven from the clock signal LCDØ at input terminal 66, such clock signal comprising a square wave having a period M corresponding to the period of the respective row signal shown in waveform 28.

Thus, the analog switches 65 switch back and forth between the two complementary input voltage to produce an alternating voltage signal output on each output terminal 67. These signals are shown in waveform 68 of FIG. 3. Each signal is a square wave having an amplitude variable in accordance with the amplitude of the video signal 32 at half the period for each pixel of the column video signal.

The alternating voltage signal 68 are fed (see FIG. 6) via output lines 67 to an array of comparators 69 for comparison with a triangular wave 71 (see FIG. 3) varying between peak amplitudes $V_C$ and $V_A$. The triangular wave 71 is applied to the comparators 69 via input line 72 as derived from the output of a triangular wave generator circuit 73. The output of each comparator 69 is a signal that is high, $V_C$, if the triangle wave 71 is of an instantaneous amplitude higher than the corresponding position of waveform 68 as derived over input line 67 and low $V_A$ if the triangular wave 71 is of lower amplitude than the corresponding portion of waveform 68 on line 67.

The output of comparators 69 comprises waveforms of constant amplitude ($V_C$31 $V_A$) which are phase modulated in accordance with the gray scale amplitude of the video signal 32. Thus, when a given pixel is not accessed by the applied row voltage, the RMS voltage contribution to that given pixel is determined by the RMS value of that portion of the column waveform 74. This RMS non access voltage is set to be slightly below the threshold voltage, i.e., 10% absorption voltage $V_{10}$ of FIG. 2. However, when a given pixel is accessed i.e., row voltage of waveform 28 is applied to that pixel, the composite waveform includes an RMS contribution of the row voltage as well as that of the phase modulated column square wave 74 containing the gray scale component. The composite waveform for a full ON RMS voltage, substantially above the threshold voltage, is shown at 70 for waveform 75 where the energized pixel corresponds to an intersection of the column signal 75 with the first row signal 28. Note that the phase of the column waveform 74 is precisely 180° out of phase with the waveform of the row voltage 28 so that a maximum composite RMS voltage differential is applied across that particular pixel. This gives the maximum RMS contribution and produces the darkest or blackest portion of the image.

Waveform 76 of FIG. 3 shows the composite voltage signal applied across a second pixel defined by the intersection of the column output waveform 74 and the second row signal at $M_2$. As before, the non-accessed pixels in the first column have a composite RMS voltage applied thereacross which is essentially at the threshold value. However, the RMS voltage at the second pixel corresponds to the composite voltage obtained by summing the second row voltage, in period $M_2$, and the corresponding portion of the column waveform 74 and produces the composite pixel RMS voltage at 70 having a value approximately midway between the full ON and the threshold value for approximately half maximum optical absorption.

Similarly, waveform 77 shows, at 70, the composite voltage applied across the energized pixel of column one and row 3 and shows a slight RMS voltage over that produced by the presence of the column drive taken alone. However, this slight amount does not significantly increase the RMS voltage over the threshold value such that this waveform represents a video signal of approximately 10% absorption or the background level.

Waveform 78 shows, at 70, the RMS voltage to be applied across the energized pixel corresponding to column one and row 4. The RMS gray scale contribution shows a duty scale of approximately ¼ of the maximum and thus the RMS value is approximately ¼ of maximum absorption. Thus, it is seen that the phase modulation of the column waveform actually produces in the composite voltage across the accesed pixels a duty cycle variation of the gray scale component, such duty cycle varying from full ON as shown in waveform 75 to essentially nothing in waveform 77, to provide a full gray scale capability between a background level and maximum absorption.

Referring again to FIG. 6, the triangular wave generator circuit 73 includes an amplifier 81 connected to reference voltages $V_D$ and O and responsive to an input square wave of gating pulses LCDØ. The amplified output gating pulses serve to provide alternating base turn-on voltages to complementary transistors 82 and 83 connected as the load on the amplifier 81.

Temperature compensating diodes 86 and slope adjusting resistive networks 84 and 85 are connected as load on amplifier 81. More particularly, diodes 86 serve to provide a temperature compensating base-to-emitter potential drop there across to compensate for the temperature variations in the base turn-on voltage to the complementary transistors 82 and 83. Variable bias resistors 87 provide means for adjusting the slope of the triangular wave produced at the output of the triangular wave generator circuit by adjusting the base voltage of the respective transistors 82 and 83. The output current from the transistors 82 and 83 is caused to flow into a storage capacitor 88 coupled to one input of an operational amplifier 89. The amplifier 89 buffer the output voltage developed across the capacitor 88 to produce the triangular output waveform 71 on output line 72.

A clamping circuit comprising a series connection of reverse biased diodes 91, operating with a symmetrically connected resistor 92, serves as a clamping network for preventing the peak amplitude of the triangular wave 71 from exceeding $V_C$ and $V_A$.

The transistor 82 and 83 serve as current sources for charging and discharging the capacitor 88. The two diodes 91 closest to the center node of the clamping circuit and connected to the capacitor 88 become conductive when the voltage on the capacitor is equal to $V_A$ or $V_C$ thus performing the clamping action.

An alternative digital version of the column driver of the present invention is shown in FIGS. 7 and 8. More particularly, the input video signal 32 to be displayed and which contains the gray scale information is fed via input terminal 95 to an analog-to-digital converter 96 to convert the analog video signal 32 to a serial stream of digital words each digital word corresponding to a respective gray scale component of the video signal 32 to a serial stream of digital words each digital word corresponding to a respective gray scale component of the video signal to be displayed. The output of the analog-to-digital converter 96 is fed to a serial-to-parallel shift register 97 which outputs the serial data onto column output channels 98. There is one output channel 98 for each column of the liquid crystal display matrix.

Each channel 98 contains the requisite number of lines for carrying the digitally encoded gray scale word for each of the channels. For example, if there are to be $2^X$ levels of gray there will need to be X number of output lines for each channel where X represents the power to which the number 2 must be raised in order to equal the number of gray scale levels. In the case of 16 gray scale levels, there will need to be 4 output lines in each channel 98.

The output lines 98 are fed to respective counters 99. In a typical example, the counters 99 comprise model MC14161 counters commercially available from Motorola. The counters are responsive to a clock signal such as that of waveform 101 of FIG. 8. The video data is clocked into the serial-to-parallel shift register 97 using the LCD$\phi$ clock signal frequency multiplied by the number of columns $N_c$ and having a period $M/N_c$.

After the shift register 97 has been filled by the sets of column gray scale words, the words are then loaded into the counters 99 as preset data in response to the load signal, such as waveform 103. The counters are presettable and divide clock 101 by $2^X$ with the first transition being determined by the output of the shift register 98, thereby providing a phase shifted LCD$\phi$ as shown by waveforms 105-107.

The output of the respective counters 99 on lines 104 comprise respective square waves of constant amplitude which are phase delayed in accordance with the count of the respective counter. Such waveforms are shown in FIG. 8 at 105, 106, and 107. Waveform 105 corresponds to a phase modulated delay of 6 units, wave 106 corresponds to a phase delay of one unit and wave 107 corresponds to a phase delay of twelve units out of a maximum phase delay of fifteen units. Thus, output waves 105-107 correspond to phase modulated wave 74 of FIG. 3 and they contain the gray scale RMS component which is summed across a given pixel with the row waveform 28 to produce the composite RMS voltage at 70 across the respective pixels as previously described with regard to waveforms 75-78.

The advantage to the multiplexed field effect liquid crystal display of the present invention is that it includes gray scale information that has not heretofore been provided by multiplexed liquid crystal displays.

As used herein, "row" and "Column" may be interchanged. These terms are used merely to define crossing arrays of electrodes. They need not be vertical and horizontal and they need not be orthogonal linear arrays.

What is claimed is:

1. In an apparatus for multiplex driving a field effect liquid crystal display matrix of pixels formed by crossing arrays of row and column electrodes of a display so as to provide a gray scale display image;

row signal generator means for generating a time variable row voltage for application to the array of row electrodes;

row multiplexing means for multiplexing the time variable row voltage to the array of row electrodes of the liquid crystal display matrix of pixels for applying one alternating component of a composite root mean square voltage sequentially across pixels of the matrix of pixels of the liquid crystal display;

column signal generating means for generating a time variable column signal voltage having an alternating component thereof with a root mean square amplitude variable in accordance with a gray scale visual portion of an image to be displayed on the liquid crystal display;

column multiplexing means for multiplexing said column signal voltage onto the array of column electrodes of the liquid crystal display matrix of pixels for sequentially energizing successive pixels of the liquid crystal display matrix with the alternating gray scale component of the column signal voltage so as to display a visual image having a gray scale component;

said column signal generating means including phase modulating means for phase modulating the alternating column signal voltage with the gray scale component of the visual image to be displayed;

said phase modulating means including counter means sequentially responsive to the amplitude of an alternating gray scale signal component representative of the visual portion of the image to be displayed for modulating the phase of the column signal voltage;

said counter means including analog-to-digital converter means responsive to the amplitude of an analog video signal, representative of the gray scale of a visual portion of an image to be displayed, for producing a serial stream of digitally encoded words representative of the gray scale of the visual portion of the image;

serial-to-parallel converter means responsive to the serial stream of digitally encoded words for converting same to parallel column words, one word for a respective column of the display; and wherein said counter means includes an array of individual counter means one for each respective column of the display, said individual counter means being responsive to respective ones of said parallel column words for producing an output delayed by the amount of the respective count, thereby phase modulating the output of said counter means in accordance with the gray scale components of the visual portion of the image displayed.

* * * * *

UNITED STATES PATENT AND TRADEMARK OFFICE
CERTIFICATE OF CORRECTION

PATENT NO. : 4,427,978

DATED : January 24, 1984

INVENTOR(S) : Marshall Williams

It is certified that error appears in the above-identified patent and that said Letters Patent is hereby corrected as shown below:

Column 6, line 5, delete "$(V_C 31\ V_A)$" and insert -- $(V_C-V_A)$ --.

Signed and Sealed this

Twenty-fourth Day of April 1984

[SEAL]

Attest:

GERALD J. MOSSINGHOFF

*Attesting Officer*     *Commissioner of Patents and Trademarks*